United States Patent Office 3,816,444
Patented June 11, 1974

3,816,444
THIAZOLINYL DERIVATIVES OF
o-PHENYLENEDIAMINES
Venkatachala Lakshmi Narayanan, Hightstown, and
Rudiger D. Haugwitz, Highland Park, N.J., assignors to
E. R. Squibb & Sons, Inc., Princeton, N.J.
No Drawing. Filed Feb. 28, 1972, Ser. No. 230,121
Int. Cl. C07d 91/26
U.S. Cl. 260—306.7           7 Claims

ABSTRACT OF THE DISCLOSURE

Thiazolinyl and thiazinyl derivatives of o-phenylenediamines are provided having the structure

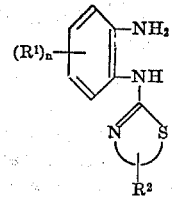

wherein $R^1$, $R^2$ and $n$ are as defined hereinafter and which are useful as disinfectants, and as starting materials in the preparation of benzimidazoles which are useful as anthelmintic agents, and also dyes.

---

The present invention relates to thiazolinyl and thiazinyl derivatives of o-phenylenediamines having the structure

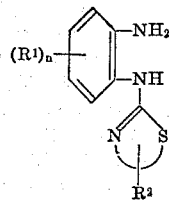

wherein $R^1$ may be the same or different and may be hydrogen, lower alkyl, aryl, substituted aryl, aralkyl, nitro, acyl, aroyl, alkoxy, aryloxy, trifluoromethyl, arylthio, halogen, lower alkythio, cyano, and amino;
$R^2$ may be hydrogen, lower alkyl, aralkyl, aryl or lower alkylaryl; and
$n$ may be 1, 2, 3 or 4 and preferably 1 or 2.

The radical

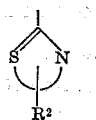

represents a 5- or 6-membered ring containing 3 or 4 carbon atoms, respectively, wherein the additional 2 or 3 carbon atoms (not shown) may include a substituent other than hydrogen as indicated above.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen.

The alkoxy group or that portion of the alkoxycarbonyl group includes straight and branched chain radicals of up to and including seven carbon atoms, corresponding to the above alkyl groups, e.g., methoxy, ethoxy, propoxy, isopropoxy, and the like. The aryloxy groups or that portion of the aryloxycarbonyl group includes any of the aryl groups set out below.

The term halogen includes each of the four halogens, but fluorine and chlorine are preferred.

The amino groups include unsubstituted as well as mono- or di-lower alkyl-, arylalkyl-, lower alkylaryl- or arylamino wherein lower alkyl and aryl are as defined herein, such as methylamino, ethylamino, heptylamino, dimethylamino, diethylamino, ethylmethylamino, butylmethylamino, ethyl i-propylamino, benzylamino, and the like.

The term "aryl" includes monocyclic or bicyclic monovalent aromatic ring systems such as phenyl or naphthyl. These aryl radicals can include as substituents halogen, nitro, trifluoromethyl, alkoxy, amido, or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic arylcarboxylic acids (e.g., benzoic and toluic acids), the monocyclic aryllower alkanoic acids [e.g., phenacetic, β-phenoylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene)pentenoic acid], and the like.

Examples of compound falling within the invention include, but are not limited to, the following set out in Table A below:

TABLE A

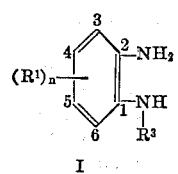

I

| | $R^1$ | $n$ | $R^3$ |
|---|---|---|---|
| 1 | H | — | ⟨N=/S⟩ |
| 2 | CH₃ (4, 5) | 2 | Same. |
| 3 | Cl (4, 5) | 2 | Do. |
| 4 | Cl (4) | 1 | Do. |
| 5 | CH₃O (4) | 1 | Do. |
| 6 | NO₂ (3) | 1 | Do. |
| 7 | NO₂ (4) | 1 | Do. |

TABLE A—Continued

| | R¹ | n | R³ |
|---|---|---|---|
| 8 | C₄H₉ (4) | 1 | (thiazoline with CH₃) |
| 9 | Br (3) | 1 | Same. |
| 10 | Br (3), CH₃O (5) | 2 | Do. |
| 11 | Br (5), CH₃ (3,4) | 3 | (thiazine) |
| 12 | C₄H₉O (4,5) | 2 | Same. |
| 13 | Cl (3,5) | 2 | Do. |
| 14 | C₂H₅O (5), NO₂ (3) | 2 | (thiazine with C₆H₅) |
| 15 | NH₂ (4) | 1 | (thiazoline) |
| 16 | O‖—CCH₃ (5) | 1 | Same. |
| 17 | N(CH₃)₂ (5) | 1 | (thiazoline with CH₃) |
| 18 | CH₂(C₆H₅) (5) | 1 | Same. |
| 19 | C₆H₅S— (4) | 1 | (thiazine) |
| 20 | C₆H₅ (4) | 1 | Same. |
| 21 | CN (3) | 1 | (thiazoline with C₆H₅) |
| 22 | CF₃ (5) | 1 | Same. |

Compounds of formula I are prepared by treating an o-phenylenediamine of formula II with a haloalkyl isothiocyanate of formula III. The resulting hydrohalides I can be converted to the free base, if desired.

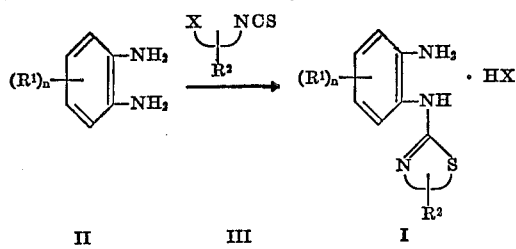

wherein X is Cl or Br.

The above reaction may be carried out at a temperature within the range of from about 15 to about 150° C. in the presence of a hydrocarbon solvent such as benzene, toluene, glyme, ethyl ether, and the like, employing a molar ratio of II:III within the range of from about 1:0.9 to about 1:1. The reaction proceeds in the absence of external base and surprisingly, mono-substituted products are obtained even though there are two potential reaction sites in the starting o-phenylenediamines II.

Alternatively, compounds of formula I can be prepared by reacting a monothiourea with an inorganic mineral acid such as hydrochloric acid, sulfuric acid or phosphoric acid to yield I. For example, this reaction can be illustrated as follows:

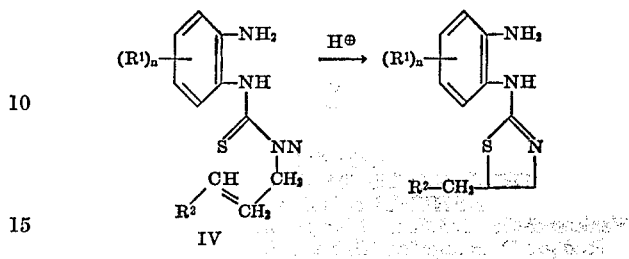

The starting o-phenylenediamines II can be prepared by methods reported in the literature as well as apparent to one skilled in the art.

Examples of starting compounds of formula II include:

TABLE B (structure: benzene ring with positions 1-6, $(R^1)_n$ substituent, 1-NH₂, 2-NH₂)

| R¹ | n |
|---|---|
| 4-Cl | 1 |
| 4,5-diCl | 2 |
| 4,5-diCH₃ | 2 |
| 4-OCH₃ | 1 |
| 3-NO₂ | 1 |
| 4-NO₂ | 1 |
| 3-Br | 1 |
| 4-Br | 1 |
| 4-Br-3,5-diCl | 3 |
| 5-Br-3,4-diCH₃ | 3 |
| 3-Br-5-OCH₃ | 2 |
| 4-C₄H₉ | 1 |
| 3,4-diCl-5,6-diCH₃ | 4 |
| 4-N(CH₃)₂ | 1 |
| 3-CN | 1 |
| 4-C̈CH₃ (O) | 1 |
| 3-C₆H₅ | 1 |
| 4-CH₃S | 1 |
| 3-CF₃ | 1 |

The monothioureas IV are prepared by reacting compound II with one mole of an allylisothiocyanate V:

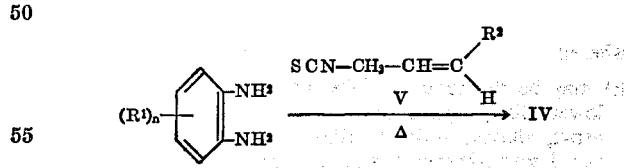

at a temperature within the range of from about 20° to about 150° C., in the presence of a solvent such as methanol, ethanol, benzene, toluene, or an ether such as ethyl ether or glyme, employing a molar ratio of II:V within the range of from about 1:1 to about 1.5:1, and preferably 1:1.

The haloalkyl isothiocyanates III are readily prepared from their corresponding haloalkylamines IV and thiophosgene.

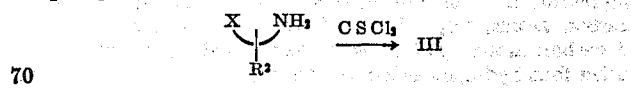

Additional methods for synthesizing haloalkyl isothiocyanates are described in Houben Weyl's *Methoden Der Organischen Chemie*, vol. 9, G. Thiene, Verlag, Stuttgart (1955).

Examples of aliphatic haloalkylisothiocyanates which can be employed herein include the following:

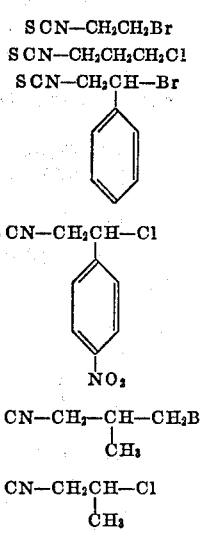

The compounds of formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The compounds of formula I may be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The compounds of the invention I are also useful in the preparation of benzimidazole anthelmintics or anti-inflammatory agents disclosed in application Ser. No. 230,122 entitled Thiazolinyl and Thiazinyl Derivatives of 2-Aminobenzimidazoles by Haugwitz and Narayanan filed concurrently herewith.

The following examples further illustrate and represent preferred embodiments of the invention.

EXAMPLE 1

2-(o-Aminoanilino)-2-thiazoline

A solution of 7.8 g. (0.07 mole) of o-phenylenediamine and 11.9 g. (0.07 mole) of 2-bromoethyl isothiocyanate in 150 ml. of dry glyme is stirred at room temperature for one hour. The solvent is then decanted and the viscous oil that remains is taken up in water, basified with potassium carbonate and extracted with warm chloroform. The combined chloroform extracts are washed with water and cooled in an ice-bath. The crystals that precipitates are collected by filtration and dried to yield 6.6 g.; recrystallization from chloroform, M.P. 165–167° C.

Anal. Calcd for $C_9H_{11}N_3S$: C, 55.92; H, 5.73; N, 21.74. Found: C, 55.73; H, 5.82; N, 21.87.

EXAMPLE 2

2-(2-Amino-4(or 5)-nitroanilino)-5,6-dihydro-4H-1,3-thiazine 15.3 g. (0.1 mole) of 4 - nitro-o-phenylenediamine (Aldrich) is dissolved in 200 ml. of dry glyme. To this solution 18.0 g. (0.1 mole) of 3-bromopropyl isothiocyanate is added and the mixture stirred overnight at room temperature. The precipitated product is collected and recrystallized from methanol to yield 18.1 g., M.P. 196–198° C. yellow needles.

Anal. Calcd for $C_{10}H_{13}N_4SBr$: C, 36.06; H, 3.94; N, 16.81. Found: C, 36.36; H, 4.14; N, 16.93.

EXAMPLE 3

2-(o-Aminoanilino)-5-methyl-2-thiazoline

To 10 g. of 1-allyl-3-(o-aminophenyl)-2-thiourea there is added 40 ml. of concentrated hydrochloric acid and the resulting solution is kept at room temperature overnight. The solution is basified with concentrated ammonia and the resulting precipitate is filtered off and washed with water. Recrystallization from methanol yields 7.5 g.; M.P. 182° C.

Anal. Calcd for $C_{16}H_{13}N_3C$: C, 57.84; H, 6.32; N, 20.27. Found: C, 58.02; H, 6.27; N, 20.16.

EXAMPLE 4

2-(2-Amino-4,5-dimethylanilino)-2-thiazoline

Following the procedure of Example 1 but replacing o-phenylenediamine with 4,5 - dimethyl-o-phenylenediamine, the title compound is obtained, M.P. 178–180° C.

Anal. Calcd for $C_{11}H_{15}N_3S$: C, 59.70; H, 6.83; N, 18.99. Found: C, 59.48; H, 6.92; N, 19.05.

EXAMPLE 5

2-(2-Amino-4,5-dimethylanilino)-5,6-dihydro-4H-1,3-thiazine, hydrobromide (1:1)

2.7 g. (0.02 mole) of 4,5-dimethyl-o-phenylenediamine is dissolved in 200 ml. of dry glyme. To this solution 3.6 g. (0.02 mole) of 3-bromopropyl isothiocyanate in 75 ml. of dry glyme is added in a dropwise manner over a period of about one hour. After the reaction has proceeded for about 0.5 hour, a white precipitate begins to form. The reaction mixture is allowed to stir at room temperature for three hours and the precipitated white crystals are filtered off and washed with ethanol and ether to yield 4.1 g., M.P. 124–127° C.

Anal. Calcd for $C_{12}H_{17}N_3S \cdot HBr$: C, 45.57; H, 5.74; N, 13.29. Found: C, 45.46; H, 5.77; N, 13.27.

EXAMPLE 6

2-(2-Amino-3(or 4)-nitroanilino)-2-thiazoline·HBr

A solution of 7.7 g. (0.05 mole) of 4-nitro-o-phenylenediamine and 8.3 g. (0.05 mole) of 2-bromoethyl isothiocyanate in 100 ml. of dry glyme is refluxed on a steam bath for one hour. The solid precipitate is filtered off and washed with water and ethyl ether to yield 8.3 g. The product is recrystallized from methanol to yield the analytically pure title compound, M.P. 204–206° C.

EXAMPLES 7 to 40

Following the procedure of Examples 1 and 2 but substituting the o-phenylenediamine derivative shown in column 1 of Table I below and the aliphatic haloalkyl isothiocyanate shown in column 2, the product shown in column 3 is obtained.

Where the o-phenylenediamine starting material is monosubstituted and includes a substituent at the 4 or 5 position, then the product shown in column 3 will include the 5-tautomer or 4-tautomer, respectively; where the o-phenylenediamine starting material is monosubstituted and includes a substituent at the 3- or 6-position, then the product shown in column 3 will include the 6-tautomer or 3-tautomer, respectively.

TABLE I

| Example | R¹ (position) | n | Haloalkylisothiocyanate | (R¹)ₙ (position) | R² structure |
|---|---|---|---|---|---|
| 7 | (CH₃)₂N (4) | 1 | SCN—CH₂CH₂—Br | As in Column 1 | thiazoline |
| 8 | C₂H₅O (5) | 1 | Same as above | do | Same as above |
| 9 | C₄H₉ (6) | 1 | do | do | Do. |
| 10 | C₅H₁₁ (4) | 1 | do | do | Do. |
| 11 | Cl (4,5) | 2 | do | do | Do. |
| 12 | CH₃C(O) (5) | 1 | do | do | Do. |
| 13 | C₆H₅(CH₃)₂ (6) | 1 | do | do | Do. |
| 14 | C₆H₅ (4) | 1 | do | do | Do. |
| 15 | C₆H₅C(O) (5) | 1 | do | do | Do. |
| 16 | C₆H₅CH₂ (4) | 1 | SCN—CH₂CH₂CH₂—Cl | do | Do. |
| 17 | C₆H₅CO (4) | 1 | Same as above | do | Do. |
| 18 | C₂H₅ (4) | 1 | do | do | Do. |
| 19 | C₂H₅O (4) | 1 | do | do | Do. |
| 20 | Cl, CH₃ (4,5) | 2 | do | do | Do. |
| 21 | (C₂H₅)NH (5) | 1 | SCN—CH₂CH₂—Br | do | Do. |
| 22 | C₂H₅S (3) | 1 | Same as above | do | Do. |
| 23 | CN (5) | 1 | do | do | Do. |
| 24 | NO₂ (4) | 1 | do | do | Do. |
| 25 | CH₃O (4) | 1 | do | do | Do. |
| 26 | NH₂ (4) | 1 | do | do | Do. |
| 27 | CF₃ (5) | 1 | do | do | Do. |
| 28 | H | — | SCN—CH₂CH(C₆H₅)—Br | do | thiazoline-C₆H₅ |
| 29 | Br (4,5) | 2 | SCN—CH₂—CH₂Br | do | thiazoline |
| 30 | CH₃ (3) | 1 | SCN—CH(CH₃)CH₂Br | do | thiazoline-CH₃ |
| 31 | C₆H₅S (4) | 1 | SCN—CH₂CHBr | do | thiazoline |
| 32 | p-CH₃C₆H₄ (5) | 1 | SCN—CH₂CH₂Br | do | Same as above |
| 33 | NO₂ (3) | 1 | SCN—CH₂CH₂Cl | do | Do. |
| 34 | H | — | SCN—CH(C₂H₅)CH₂—Br | do | thiazoline-C₂H₅ |
| 35 | C₆H₅C(O) (4) | 1 | SCN—CH₂CH₂Br | do | thiazoline |
| 36 | C₂H₅O (6) | 1 | SCNCH₂CH₂Br | do | Same as above |

TABLE I—Continued

| | Column 1 | | | | Column 2 | | Column 3 | |
|---|---|---|---|---|---|---|---|---|
| Example | $R^1$ (position) | | | $n$ | Haloalkylisothiocyanate | | $(R^1)_n$ (position) | $R^2$ |
| 37 | $NO_2$ (6) | | | 1 | $SCNCH_2CH_2CH_2Br$ | | As in Column 1 | |
| 38 | Cl (4) | | | 1 | Same as above | | do | Same as above. |
| 39 | $C_6H_{11}$ (4) | | | 1 | $SCNCH_2CH_2CHBr$<br>   $\mid$<br>   $C_6H_5$ | | do | |
| 40 | H | | | | $SCNCH_2CH_2CHCl$<br>   $\mid$<br>   $C_6H_5$ | | do | Same as above. |

EXAMPLES 41 TO 47

Following the procedure of Example 3 and utilizing the monothiourea derivative in column 1, Table II, and the mineral acid shown in column 2, the product shown in column 3 is obtained.

carbocyclic aroyl, monocarbocyclic aryl-lower alkanoyl, cycloalkanoyl, cycloalkenoyl, cycloalkyl-lower alkanoyl, cycloalkenyl-lower alkanoyl, lower alkoxy, aryloxy, trifluoromethyl, lower alkylthio, arylthio, halo, cyano, amino, mono- or di-lower alkylamino, mono- or diaryl-

TABLE II

| | Column 1 | | | | Column 2 | Column 3 | |
|---|---|---|---|---|---|---|---|
| Example | $R^1$ (position) | $n$ | $R^2$ | Acid | | $(R^1)_n$ (position) | $R^3$ |
| 41 | $CH_3$ (4, 5) | 2 | H | HCl | | As in Column 1 | $CH_3$ |
| 42 | $NO_2$ (4) | 1 | H | HCl | | do | $CH_3$ |
| 43 | $C_6H_5$ (4) | 1 | H | HCl | | do | $CH_3$ |
| 44 | $C_6H_5\overset{O}{\underset{\|\|}{C}}$ (4) | 1 | H | HCl | | do | $CH_3$ |
| 45 | | | $CH_3$ | $H_2SO_4$ | | do | $C_2H_5$ |
| 46 | H | | H | HCl | | do | $CH_3$ |
| 47 | Cl (4, 5) | 2 | | HCl | | do | $CH_3$ |

What is claimed is:
1. A compound having the structure:

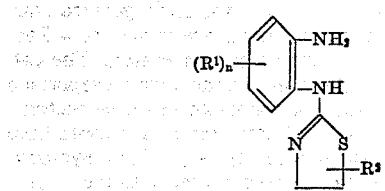

wherein each $R^1$ can be the same or different and is selected from the group consisting of hydrogen, lower alkyl, aryl, aralkyl, nitro, lower alkanoyl, lower alkenyl, mono- alkylamino, mono- or di-lower alkyl-arylamino, and mono- or diarylamino; $R^2$ is selected from the group consisting of hydrogen, lower alkyl, aralkyl, aryl and lower alkyl-aryl; $n$ is 1, 2, 3, or 4; wherein the term aryl refers to phenyl, naphthyl, or phenyl or naphthyl substituted with halogen, nitro, trifluoromethyl, lower alkoxy, amido, or lower alkyl; wherein the term lower alkyl refers to alkyl groups having up to 7 carbon atoms; and physiologically acceptable acid-addition salts thereof.

2. A compound in accordance with claim 1 having the name 2-(o-aminoanilino)-2-thiazoline.

3. A compound in accordance with claim 1 having the name 2-(o-aminoanilino)-5-methyl-2-thiazoline.

4. A compound in accordance with claim 1 having the name 2 - (2 - amino - 4,5 - dimethylanilino)-2-thiazoline.

5. A compound in accordance with claim 1 having the name 2 - (2 - amino - 3 - nitroanilino) - 2 - thiazoline, hydrobromide.

6. A compound in accordance with claim 1 having the name - (2 - amino - 4 - nitroanilino) - 2 - thiazoline, hydrobromide.

7. A process for preparing a compound defined in claim 1 which comprises treating an o-phenylenediamine of the structure:

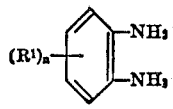

with a haloalkyl isothiocyanate of the structure:

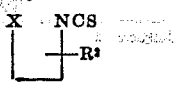

wherein X is Cl or Br.

References Cited

Elderfield: (ed.), *Heterocyclic Compounds*, vol. 5, John Wiley & Sons, N.Y., 1957, pp. 187–90.

RICHARD J. GALLAGHER, Primary Examiner

U.S. Cl. X.R.

260—243 R, 454, 552 R; 424—246, 270

UNITED STATES PATENT OFFICE
CERTIFICATE OF CORRECTION

Patent No. 3,816,444                    Dated June 11, 1974

Inventor(s) Venkatachala L. Narayanan and Rudiger D. Haugwitz

It is certified that error appears in the above-identified patent and that said Letters Patent are hereby corrected as shown below:

Column 3, Example 8, column $R^3$, the formula should read as follows:

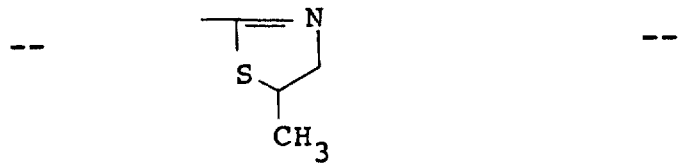

Column 3, Example 15, column $R^3$, the formula should read as follows:

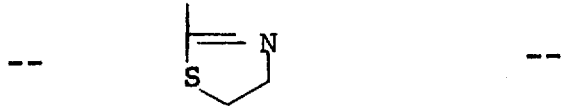

Column 3, Example 17, column $R^3$, the formula should read as follows:

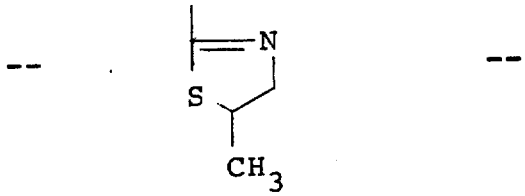

Column 4, lines 10 through 15, structure IV, that portion of the formula that reads:

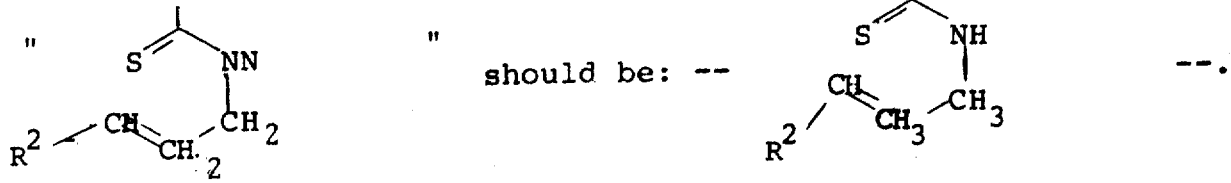

Page - 2

UNITED STATES PATENT OFFICE
CERTIFICATE OF CORRECTION

Patent No. 3,816,444                    Dated June 11, 1974

Inventor(s) Venkatachala L. Narayanan and Rudiger D. Haugwitz

It is certified that error appears in the above-identified patent and that said Letters Patent are hereby corrected as shown below:

Column 4, lines 50 to 55, the structure should be labeled: -- II --

Column 4, lines 67 to 70, the structure should be labeled:
    -- IV --.

Column 6, line 24, that portion reading: "$C_{16}H_{13}N_3C$: " should be: -- $C_{10}H_{13}N_3S$: --.

Column 8, Example 16, column 3, the formula should read:

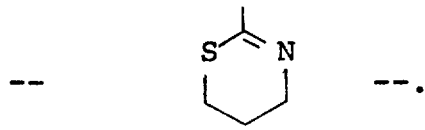

Column 9, Example 45, column labeled $R^1$ (position), insert: -- H --.

Column 9, Example 47, column labeled $R^2$, insert: -- H --.

Column 10, Table II, column 3, that portion of the formula reading:

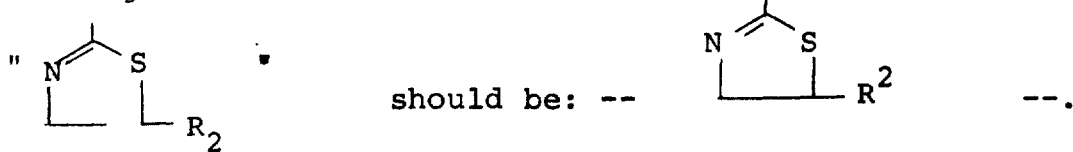

Column 9, line 75, the word "alkenyl" should be: -- alkenoyl --.

Signed and sealed this 24th day of September 1974.

(SEAL)
Attest:

McCOY M. GIBSON JR.                    C. MARSHALL DANN
Attesting Officer                       Commissioner of Patents